United States Patent
Super et al.

(10) Patent No.: US 7,325,671 B2
(45) Date of Patent: Feb. 5, 2008

(54) BOWL FOR VIBRATORY FEEDER

(75) Inventors: Daniel B. Super, Clymer, PA (US); F. Michael Schuchs, Fulton, MS (US); Michael K. Mihelic, Saltillo, MS (US); Robert J. Julock, Dixonville, PA (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 10/992,900

(22) Filed: Nov. 19, 2004

(65) Prior Publication Data

US 2005/0115806 A1   Jun. 2, 2005

Related U.S. Application Data

(60) Provisional application No. 60/524,206, filed on Nov. 21, 2003.

(51) Int. Cl.
   *B65G 27/08* (2006.01)
(52) U.S. Cl. ..................... 198/756; 198/757
(58) Field of Classification Search ............. 198/756, 198/757, 391
   See application file for complete search history.

(56) References Cited

U.S. PATENT DOCUMENTS

| | | | | |
|---|---|---|---|---|
| 3,011,625 A | * | 12/1961 | Bailey et al. | 198/757 |
| 3,838,770 A | * | 10/1974 | Caffa | 198/757 |
| 4,440,286 A | * | 4/1984 | Saxon | 198/380 |
| 4,711,337 A | | 12/1987 | Bartlett | |
| 4,815,190 A | * | 3/1989 | Haba et al. | 29/430 |
| 5,269,440 A | | 12/1993 | Bohnert et al. | |
| 5,713,454 A | * | 2/1998 | Jordan | 198/391 |
| 6,161,679 A | | 12/2000 | Graham | |

FOREIGN PATENT DOCUMENTS

| DE | 30 35 227 A1 | 4/1982 |
|---|---|---|
| DE | 37 23 339 A1 | 1/1989 |

* cited by examiner

*Primary Examiner*—Gene O. Crawford
*Assistant Examiner*—Ramya G. Prakasam
(74) *Attorney, Agent, or Firm*—Henry C. Query, Jr.

(57) ABSTRACT

A bowl for a vibratory feeder includes a wall portion having a generally circular cross section and a helical track having an inner diameter and an outer diameter. The wall portion comprises a plurality of slots and the track comprises a plurality of tabs which extend from one of the inner diameter or the outer diameter. The tabs are received in corresponding ones of the slots to thereby position the track relative to the wall portion.

20 Claims, 6 Drawing Sheets

BOWL FOR VIBRATORY FEEDER

BACKGROUND OF THE INVENTION

The present invention relates to a bowl for a vibratory parts feeder. More specifically, the present invention relates to an improved bowl for a vibratory feeder and a method for manufacturing the bowl.

Vibratory parts feeders are used in a variety of applications to convey parts to a predetermined location in a specified attitude and at a desired feed rate. In its basic form, a circular type vibratory feeder normally comprises a cylindrical or conical bowl, a vibratory drive and a controller. In operation, parts are charged into the bowl, and as the bowl vibrates, the parts move in a circular motion from the bottom of the bowl towards its top, where they are discharged to a predetermined location. The parts ride on cantilevered tracks which project from the wall of the bowl at a predetermined pitch. The pitch is the vertical rise relative to the horizontal travel of the track, and this determines how many revolutions around the bowl are required for a part to reach the top of the bowl. The tracks may be mounted either internally or externally of the bowl, and certain devices may be added to the tracks to help orient, inspect, or otherwise manipulate the parts. In addition, the bowl may be cast or fabricated, and can be made from either metallic or nonmetallic materials.

A common type of bowl for a vibratory feeder includes a generally cylindrical wall portion, a number of internal tracks and a bottom portion. The wall portion is usually constructed by cutting or stamping a piece of sheet metal to shape, marking the pitch of the tracks on the wall and then forming the wall into a cylinder. The track can consist of one piece or several pieces which are fastened together. Each piece consists of an arcuate ring segment which has an outside diameter that is approximately equal to the inside diameter of the wall. Each ring segment is cut or stamped from sheet metal and then formed with the proper pitch and slope. The bottom portion closes the lower end of the wall, thus creating a container which can be charged with parts. The bottom is cut to size from sheet metal and then typically formed into a conical shape. The bottom thus forms a convex surface which helps the parts flow from the center of the bowl to the tracks. After the wall portion, the tracks and the bottom portion have been fabricated, they are fitted together and then welded to create the bowl. Further operations, such as cleaning or modifying the basic bowl structure are performed as required.

This prior art technique for manufacturing the bowl is relatively time intensive and, therefore, costly. In addition, this technique requires a great deal of welding, which can cause distortion in the wall portion, the tracks and the bottom portion that can interfere with the movement of the parts through the bowl.

SUMMARY OF THE INVENTION

In accordance with the present invention, these and other disadvantages in the prior art are addressed by providing a bowl for a vibratory feeder which includes a wall portion that comprises a generally circular cross section and a helical track that comprises an inner diameter and an outer diameter. The wall portion comprises a plurality of slots and the track comprises a plurality of tabs which extend from one of the inner diameter or the outer diameter. In addition, the tabs are received in corresponding ones of the slots to thereby position the track relative to the wall portion.

In accordance with one embodiment of the invention, the tabs are affixed to the slots, such as by welding, to thereby connect the track to the wall portion.

In accordance with another embodiment of the invention, the wall portion comprises an inner surface and an outer surface, the tabs extend from the outer diameter of the track, and the track is positioned on the inner surface of the wall portion.

In accordance with yet another embodiment of the invention, the slots may comprise varying lengths, the tabs may comprise varying lengths. and the lengths of the tabs may correspond to the lengths of the slots into which they are inserted.

In accordance with a further embodiment of the invention, the track may comprise a number of individual arcuate track segments.

In accordance with the method of the present invention, a blank is cut from a sheet of material, the blank is formed into a wall portion which comprises a generally circular cross section, a helical track is provided which comprises an inner diameter and an outer diameter, a plurality of slots are formed in the wall portion, a plurality of tabs are formed on one of the inner diameter or the outer diameter of the track, and the tabs are inserted into corresponding ones of the slots to thereby position the track relative to the wall portion.

In accordance with a further embodiment of the invention, the wall portion is positioned in a welding fixture prior to positioning the track relative to the wall portion, the track is clamped to the wall portion, and the tabs are welded to the slots to thereby connect the track to the wall portion. In addition, the welding step may be performed robotically.

Thus, the bowl of the present invention is relatively simple, and therefore cost effective, to manufacture. In addition, the use of the tabs and slots to position the track relative to the wall portion reduces the amount of welding required to connect these components together. Consequently, any distortion of the wall portion and the track due to welding will be minimized.

These and other objects and advantages of the present invention will be made apparent from the following detailed description, with reference to the accompanying drawings.

DETAILED DESCRIPTION OF THE PREFERRED EMBODIMENTS

Figure 1:
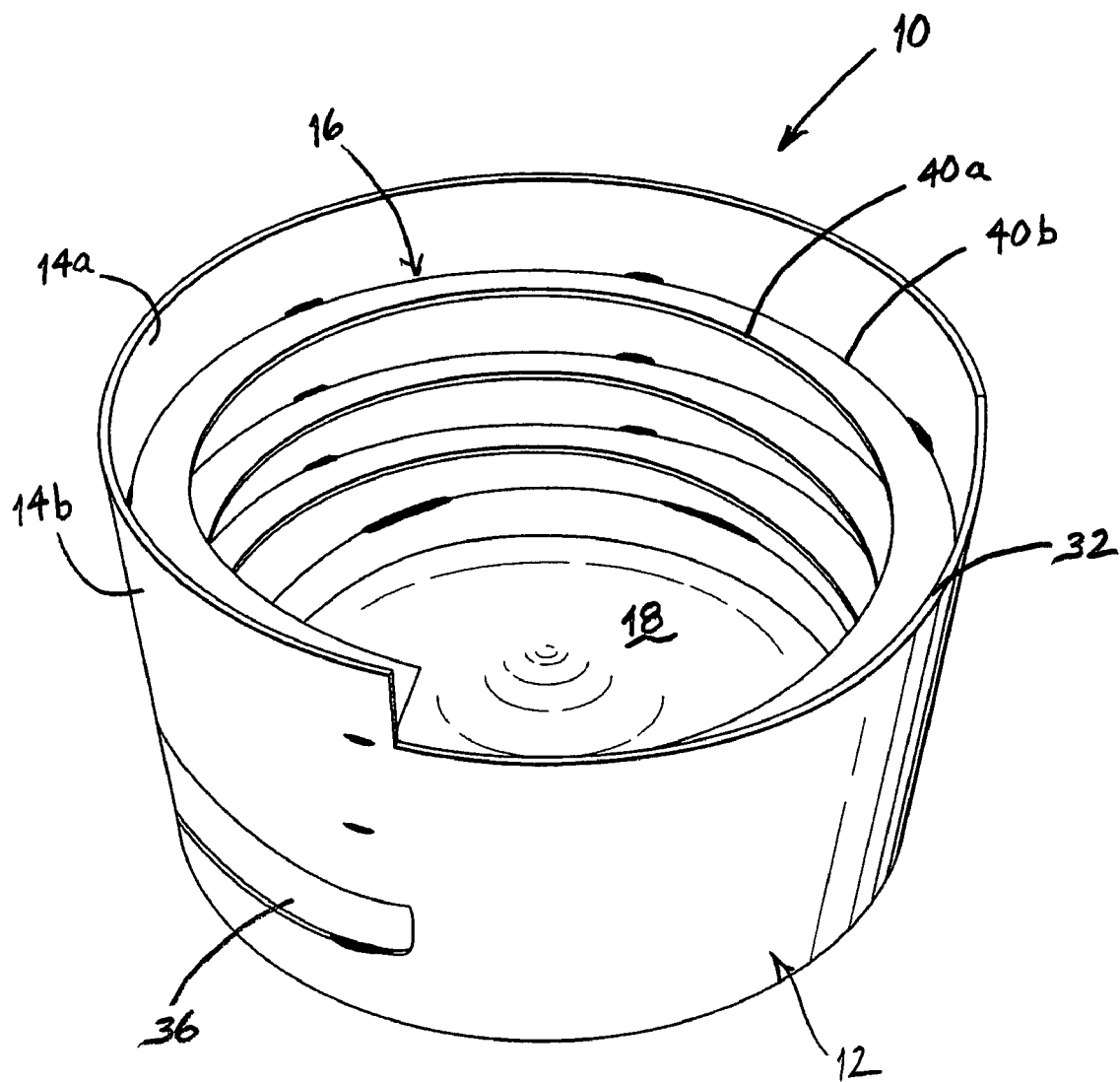
FIG. 1 is a perspective view of the bowl of the present invention.

Referring to FIG. 1, the vibratory feeder bowl of the present invention, which is indicated generally by reference number 10, includes an annular wall portion 12 which comprises an inner surface 14a and an outer surface 14b, a helical track 16 which in the exemplary embodiment of the invention is attached to the inner surface of the wall portion, and a generally conical bottom portion 18 which is connected to the lower end of the wall portion. The wall portion 12 can have a cylindrical, conical or other such shape which comprises a generally circular cross section. For purposes of simplicity, however, the bowl 10 will be described herein as having a generally cylindrical wall portion 12. Also, the wall portion 12, the track 16 and the bottom portion 18 can be constructed of any suitable material, such as metal.

Figure 2:
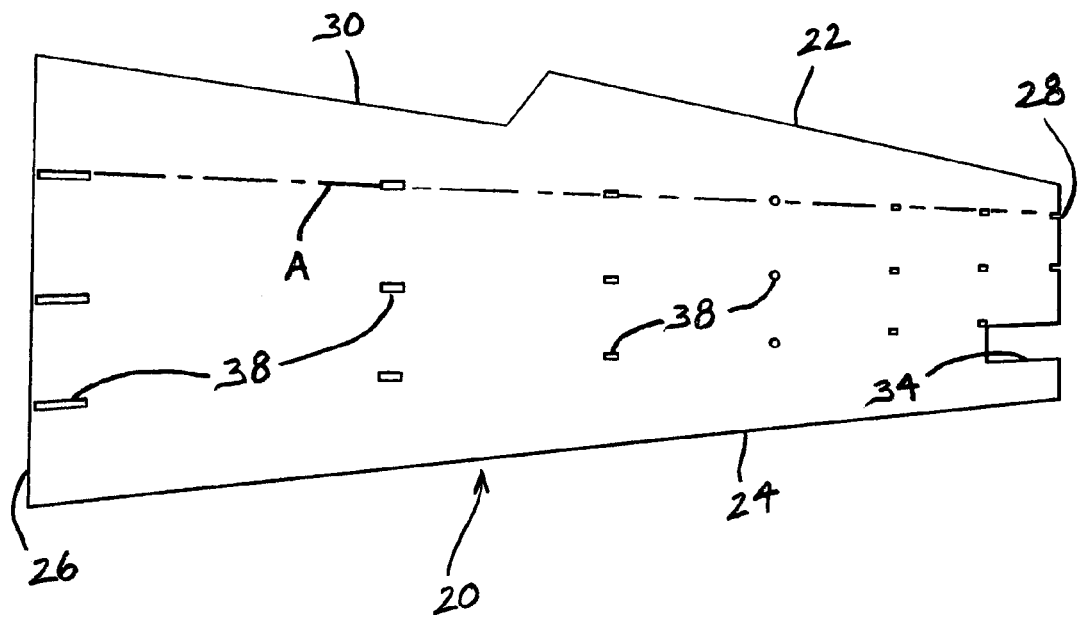
FIG. 2 is a front perspective view of the blank which is used to make the wall portion of the bowl of FIG. 1.

Referring to FIG. 2, the wall portion is ideally constructed from a generally rectangular wall blank 20 which is cut, stamped or otherwise formed from sheet metal. It is noted that FIG. 2 is a front perspective view as seen from the left end of the wall blank 20. Therefore, although not readily apparent in this Figure, the wall blank 20 comprises generally parallel upper and lower ends 22 and 24, respectively, and generally parallel left and right sides 26 and 28, respectively. In addition, the upper end 22 may include a reduced-height portion 30 which, when the left and right sides 26, 28 are connected together as illustrated in FIG. 1, forms an outlet 32 for the bowl 10. Also, the right side 28 may comprises a generally rectangular cut-out section 34 which, as shown in FIG. 1, forms an inlet 36 for bowl 10.

In accordance with the present invention, the wall blank 20 includes a plurality of apertures or slots 38 which optimally comprise varying lengths. The slots 38 may be arranged in columns of, for example, three, and each row of slots is ideally positioned along a respective line, such as indicated at A, which is oriented at an angle corresponding to the pitch of the track 16. The slots 38 can be formed in the blank 20 by milling, laser-cutting, wire-EDM, punching, or any other suitable method.

In the exemplary embodiment of the invention shown in FIG. 1, the track 16 comprises an inner diameter 40a and an outer diameter 40b, and the track is attached to the inner surface 14a of the wall portion 12. Accordingly, the outer diameter 40b optimally corresponds to the diameter of the inner surface 14a. Of course, the track 16 could alternatively be attached to the outer surface 14b of the wall portion 12, in which event the inner diameter 40a would correspond to the diameter of the outer surface 14b.

Figure 3:
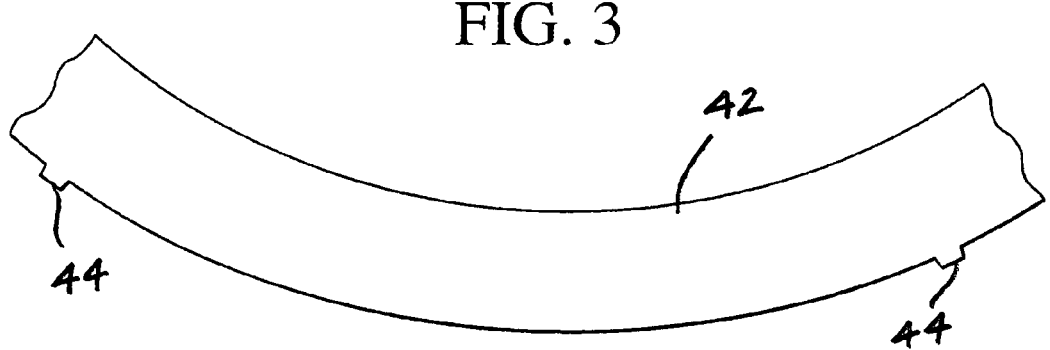
FIG. 3 is a partial top plan view of a track segment which is used in the bowl of FIG. 1.
Figure 4:
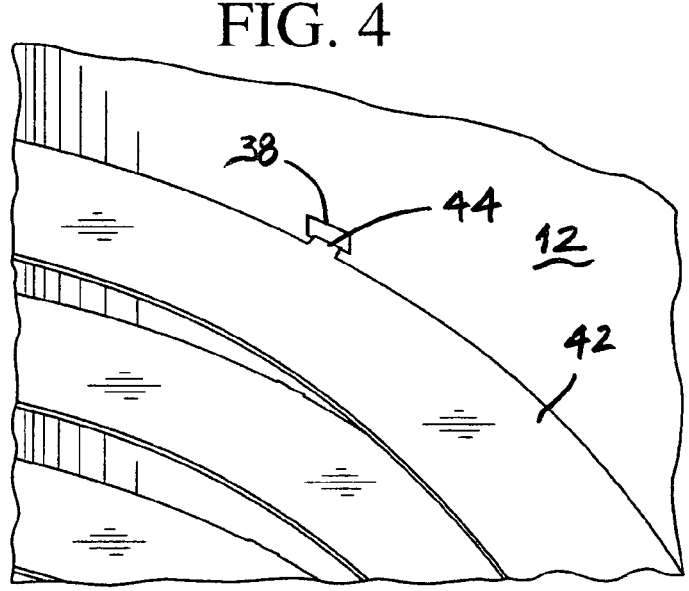
FIG. 4 is a close-up perspective view of a track segment being assembled with the wall portion.
Figure 5:
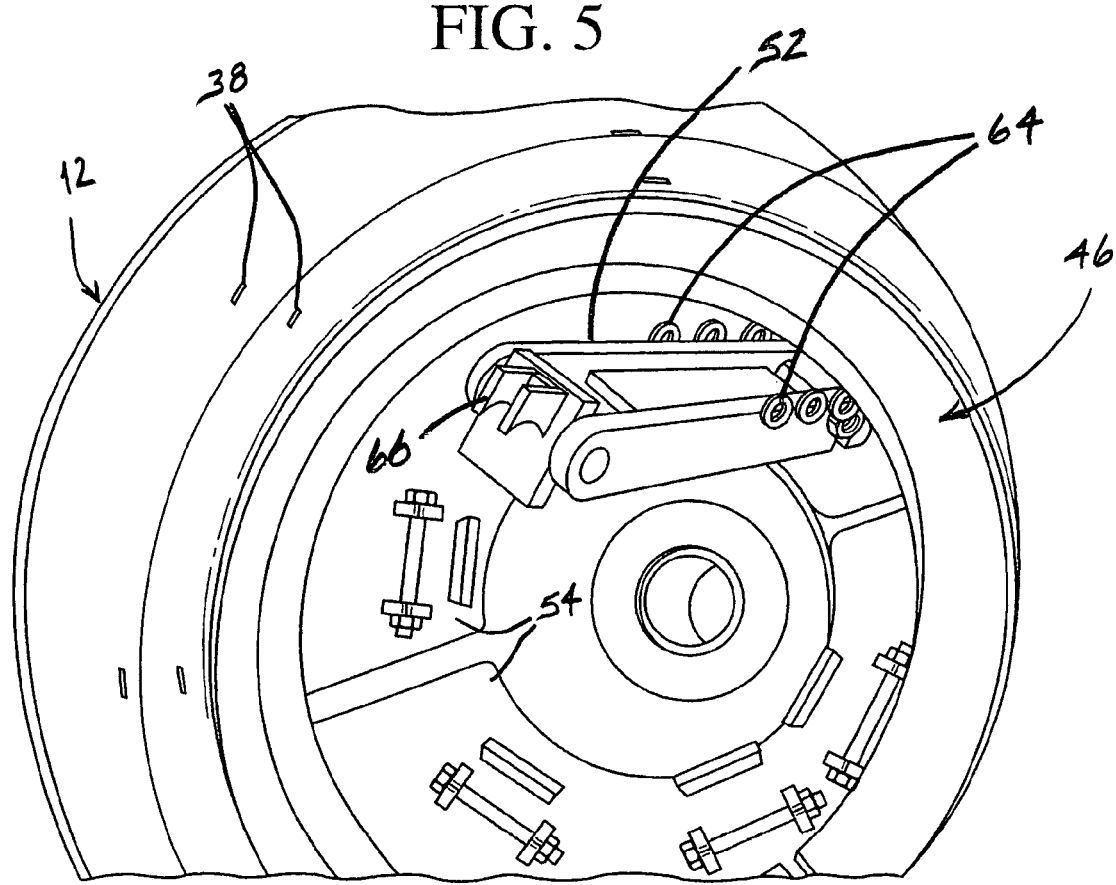
FIG. 5 is a partial top perspective view of a portion of the welding fixture of the present invention which is used in the construction of the bowl.
Figure 6:
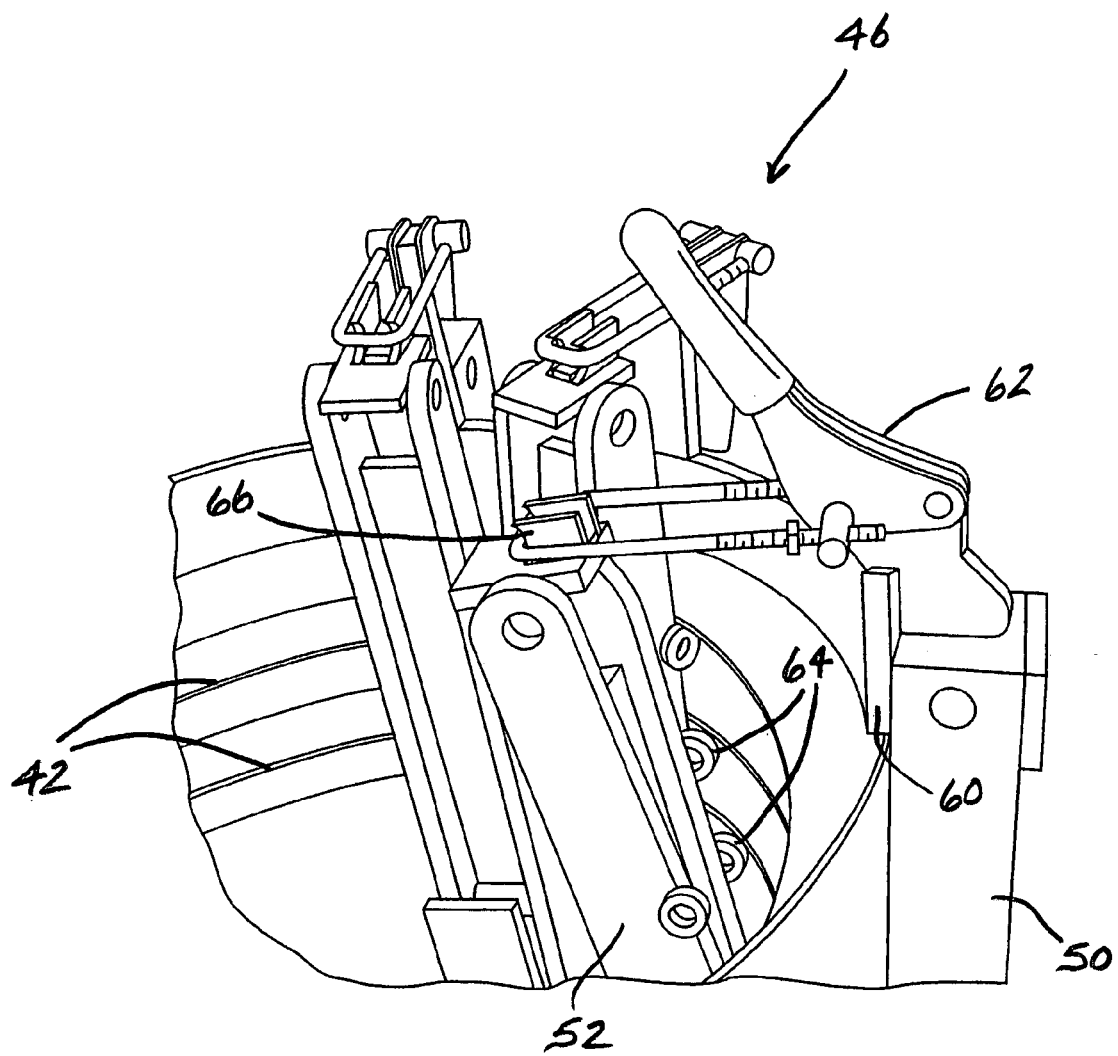
FIG. 6 is a partial perspective view of a portion of the welding fixture shown in FIG. 5.

Referring now to FIG. 3, the track 16 may be constructed of a number of individual arcuate segments 42 which are cut, stamped or otherwise formed from sheet metal. In addition, each track segment 42 comprises a number of tabs 44 which, as shown in FIG. 4, are inserted into the slots 38 during assembly of the track 16 with the wall portion 12. Therefore, the lengths and positions of the tabs 44 ideally correspond to the lengths and positions of the slots 38 into which they are inserted. The slots 38 and the tabs 44 serve to accurately locate and mechanically lock the track segments 42 to the wall portion 12 at the desired positions.

The tabs 44 cab be cut, formed or machined integrally with the track segments 42, or constructed separately and then welded or otherwise attached to the track segments. In the embodiment of the invention illustrated in the figures, the track 16 is attached to the inner surface 14a of the wall portion 12. Accordingly, the tabs 44 are positioned on the outer diameter 40b of the track 16. In other embodiments, however, the track 16 could be mounted externally of the wall portion 12, in which event the tabs 44 would be positioned on the inner diameter 40a of the track.

In an exemplary embodiment of the invention, each track segment 42 also includes an indexing tab which is used to establish the midpoint location of the track segment. In one embodiment of the invention, the indexing tabs comprise the shortest tabs 44, and the remaining tabs become progressively longer the closer they are to the ends of the track segment 42. Thus, in this embodiment the tabs 44 are arranged symmetrically about the indexing tab, and the longest tabs are located closest to the left and right ends 26, 28 of the wall blank 20. This arrangement aids in the assembly of the track segments 42 with the wall portion 12 and strengthens the bowl 10 against the forces which are encountered when these components are secured together.

As shown in FIG. 4, the slots 38 may be made slightly longer than their corresponding tabs 42. This aids in the assembly of each track segment 42 with the wall portion 12 and also provides a cavity to facilitate plug welding of the track segment to the wall portion.

In accordance with the present invention, the bowl 10 is constructed by first bending the blank 20 into a generally cylindrical or other desired shape to form the wall portion 12, then attaching the track segments 42 to the wall portion, and then attaching the bottom portion 18 to the lower end of the wall portion. An acceptable method for attaching these components together is by welding. Moreover, although the components of the bowl 10 can be welded manually, the welding process may also be performed robotically.

In order to facilitate the welding process, the components of the bowl 10 may be assembled in a welding fixture, which is indicated generally in FIGS. 5 through 8 by reference number 46. The welding fixture 46 comprises a base 48, a number of outer clamp members 50 which are rigidly secured at their lower ends to the base, and a corresponding number of inner clamp members 52 which are pivotably, and preferably also removably, connected at their lower ends to the base generally opposite the outer clamps. The base 48 ideally comprises two arcuate segments 54 which are hinged together at their one end by suitable means, such as a pin 56, and clamped together at their other end by, for example, a hook and latch assembly 58. In addition, each outer clamp member 50 includes an upper stop 60 and a latch 62, and each inner clamp member 52 includes a number of suitable track supports 64 and a hook 66.

During the construction of the bowl 10, the blank 20 is formed into the desired shape and then placed into the welding fixture 46 so that its lower end rests on the base 48. The segments 54 of the base 48 are then fastened together with the hook and latch assembly 58 to bring the outer clamp members 50 against the outer surface of blank 20 and the upper stops 60 against the upper end of the blank. This brings the left and right sides 26, 28 of the blank tightly together, and these sides are then welded to complete the construction of the wall portion 12. The track segments 42 are then assembled with the wall portion 12 by inserting the tabs 44 into their corresponding slots 38. The inner clamp members 52 are then pivoted into position against the track segments 42 and secured to their corresponding outer clamp members 50 with the latches 62. In this position, the track segments 42 are supported by the track supports 64, which are specifically positioned on the inner clamp members 52 to maintain the track segments at a desired pitch.

Figure 7:
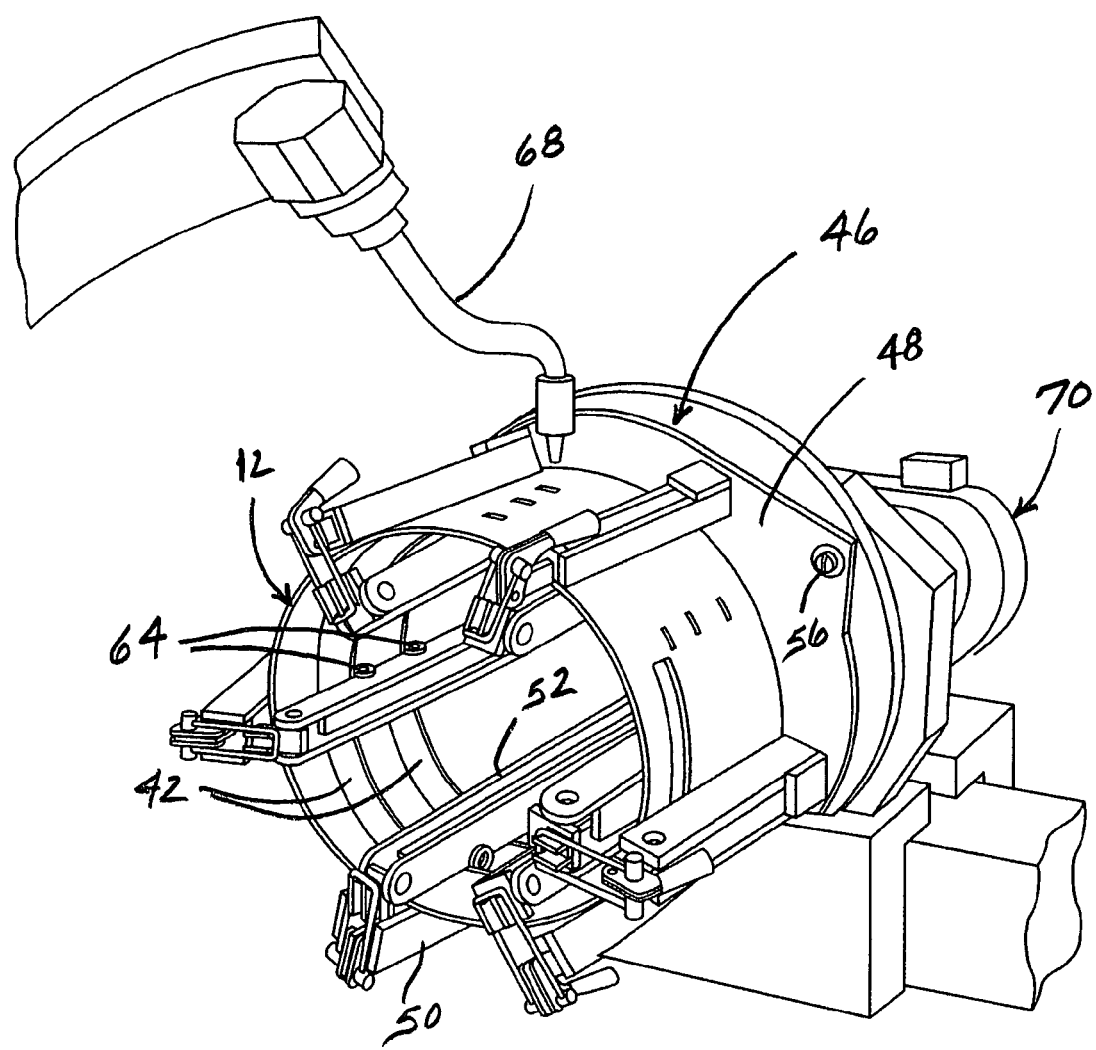
FIG. 7 is a perspective view of the bowl being robotically welded.
Figure 8:
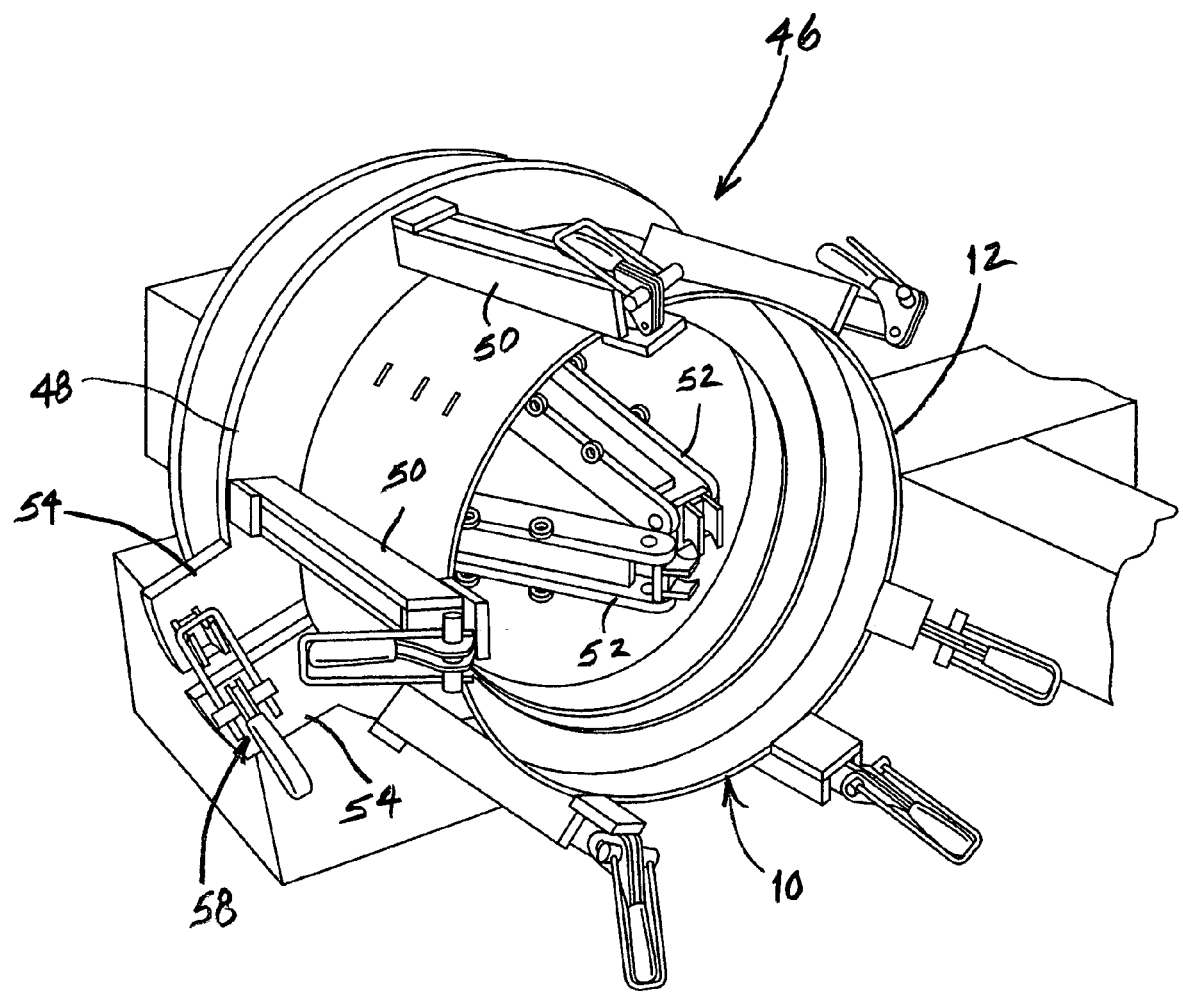
FIG. 8 is a perspective view of the welded bowl ready for removal from the welding fixture.

With the wall portion 12 and the track segments 42 secured together in this manner, they are ready to be welded together. Since the junctions of the tabs 44 with the slots 38 are accessible externally of the wall portion 12, the welding operation may performed with little difficulty. In addition, the accessibility of the weld locations facilitates the welding of the bowl 10 with, for example, the robotic welder 68 which is illustrated schematically in FIG. 7. Furthermore, if as shown in FIG. 7 the welding fixture 46 is mounted on a rotating support structure 70, the entire welding process may be automated.

In other embodiments of the invention, the track segments 42 could be attached to the wall portion 12 using any suitable attachment means. Also, the individual components of the bowl 10 could be made of any suitable metallic or non-metallic material. In addition, the individual components of the bowl 10 could be cast, machined or fabricated, as may be desired or required for a particular application. Furthermore, persons of ordinary skill in the art will recognize that any of the methods for fabricating the bowl 10 can also be applied to bowls having externally mounted tracks.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. A bowl for a vibratory feeder which includes:
   a wall portion which comprises a generally circular cross section, an inner surface and an outer surface; and
   a helical track which comprises an inner diameter and an outer diameter;
   wherein the wall portion comprises a plurality of slots and the track comprises a plurality of tabs which are formed integrally with the track and which extend from one of the inner diameter or the outer diameter; and
   wherein the tabs are received in corresponding ones of the slots to thereby position the track relative to the wall portion.

2. The bowl of claim 1, wherein the tabs are affixed to the slots to thereby connect the track to the wall portion.

3. The bowl of claim 2, wherein the tabs are welded to the slots.

4. The bowl of claim 1, wherein the tabs extend from the outer diameter of the track and the track is positioned on the inner surface of the wall portion.

5. The bowl of claim 1, wherein the slots comprise varying lengths.

6. The bowl of claim 5, wherein the tabs comprise varying lengths.

7. The bowl of claim 6, wherein the lengths of the tabs correspond to the lengths of the slots into which they are inserted.

8. The bowl of claim 1, wherein the track comprises a number of individual arcuate track segments.

9. A method for manufacturing a bowl for a vibratory feeder, the method comprising:
   cutting a wall blank from a sheet of material;
   forming the wall blank into a wall portion which comprises an inner surface, an outer surface and a generally circular cross section;
   providing a helical track which comprises an inner diameter and an outer diameter;
   forming a plurality of slots in the wall portion;
   forming a plurality of tabs integrally with the track on one of the inner diameter or the outer diameter of the track; and
   inserting the tabs into corresponding ones of the slots to thereby position the track relative to the wall portion.

10. The method of claim 9, further comprising affixing the tabs to the slots to thereby connect the track to the wall portion.

11. The method of claim 10, wherein the affixing step comprises welding the tabs to the slots.

12. The method of claim 9, wherein the step of forming a plurality of slots in the wall portion comprises forming the slots in the blank prior to forming the blank into the wall portion.

13. The method of claim 9, wherein the tabs are formed on the outer diameter of the track and the track is positioned on the inner surface of the wall portion.

14. The method of claim 9, wherein the slots comprise varying lengths.

15. The method of claim 14, wherein the tabs comprise varying lengths.

16. The method of claim 15, wherein the lengths of the tabs correspond to the lengths of the slots into which they are inserted.

17. The method of claim 9, wherein the step of providing the track comprises forming the track from a plurality of individual arcuate track segments.

18. The method of claim 17, wherein the track segments are cut from a sheet of material.

19. The method of claim 9, further comprising:
   positioning the wall portion in a welding fixture prior to positioning the track relative to the wall portion;
   clamping the track to the wall portion; and
   welding the tabs to the slots to thereby connect the track to the wall portion.

20. The method of claim 19, wherein the welding step is performed robotically.

* * * * *